(12) United States Patent
Xie (10) Patent No.: US 10,519,965 B2
(45) Date of Patent: Dec. 31, 2019

(54) METHOD AND SYSTEM FOR FIBER REINFORCED COMPOSITE PANELS

(71) Applicant: General Electric Company, Schenectady, NY (US)

(72) Inventor: Ming Xie, Beavercreek, OH (US)

(73) Assignee: General Electric Company, Schenectady, NY (US)

(*) Notice: Subject to any disclaimer, the term of this patent is extended or adjusted under 35 U.S.C. 154(b) by 791 days.

(21) Appl. No.: 14/996,626

(22) Filed: Jan. 15, 2016

(65) Prior Publication Data

US 2017/0204870 A1 Jul. 20, 2017

(51) Int. Cl.
*F04D 29/02* (2006.01)
*F04D 29/52* (2006.01)
*F01D 21/04* (2006.01)

(52) U.S. Cl.
CPC ......... *F04D 29/023* (2013.01); *F01D 21/045* (2013.01); *F04D 29/526* (2013.01); *F05D 2220/36* (2013.01); *F05D 2230/50* (2013.01); *F05D 2240/14* (2013.01); *F05D 2240/30* (2013.01); *F05D 2250/283* (2013.01); *F05D 2300/603* (2013.01);
(Continued)

(58) Field of Classification Search
CPC .... F04D 29/023; F04D 29/526; F01D 21/045; F05D 2220/36; F05D 2230/50; F05D 2240/14; F05D 2240/30; F05D 2250/283; F05D 2300/603; F05D 2300/6034; F05D 2300/614
USPC ...................................... 415/173.4
See application file for complete search history.

(56) References Cited

U.S. PATENT DOCUMENTS

| 28,155 A | 5/1860 | Church et al. |
| 1,368,215 A | 2/1921 | Stewart |

(Continued)

FOREIGN PATENT DOCUMENTS

| CN | 1128514 A | 8/1996 |
| CN | 1680684 A | 10/2005 |

(Continued)

OTHER PUBLICATIONS

Xie, M., Fan case containment system and method of fabrication, GE co-pending U.S. Appl. No. 61/370,540, filed Aug. 4, 2010.
(Continued)

*Primary Examiner* — Aaron R Eastman
(74) *Attorney, Agent, or Firm* — Dority & Manning, P.A.

(57) ABSTRACT

A composite panel structure and a method of fabricating the composite panel structure are provided. A fan assembly includes a plurality of blades circumferentially spaced about a fan disk. Each blade of the plurality of blades extends radially outwardly from the disk to a blade tip. A fan case assembly circumscribes the plurality of blades. The fan case assembly includes a radially outer casing including a radially inner side, an inner structure including an inner surface and a honeycomb layer extending along the radially inner side, and a composite panel structure including an inner surface and extending circumferentially along the inner structure inner surface. The composite panel structure includes short fiber tows extending only partially along at least one of a circumferential path, an axial path, and a diagonal path in the composite panel structure.

14 Claims, 4 Drawing Sheets

(52) U.S. Cl.
  CPC ................ *F05D 2300/6034* (2013.01); *F05D 2300/614* (2013.01); *Y02T 50/672* (2013.01)

(56) References Cited

U.S. PATENT DOCUMENTS

| | | |
|---|---|---|
| 3,446,251 A | 5/1969 | Dow |
| 3,874,422 A | 4/1975 | Dow |
| 4,012,549 A | 3/1977 | Slysh |
| 4,086,378 A * | 4/1978 | Kam ............... B29C 70/22 428/34.5 |
| 4,137,354 A | 1/1979 | Mayes, Jr. et al. |
| 4,385,952 A | 5/1983 | Futakuchi et al. |
| 4,438,173 A * | 3/1984 | Trost ............... D03D 13/002 139/383 R |
| 4,671,841 A * | 6/1987 | Stephens ............... B32B 3/12 156/292 |
| 4,699,567 A | 10/1987 | Stewart |
| 4,869,774 A | 9/1989 | Wisbey |
| 4,961,685 A | 10/1990 | Neubert |
| 5,344,280 A | 9/1994 | Langenbrunner et al. |
| 5,431,532 A | 7/1995 | Humke et al. |
| 5,451,448 A | 9/1995 | Sawko et al. |
| 5,486,086 A | 1/1996 | Bellia et al. |
| 5,508,085 A | 4/1996 | Lockshaw et al. |
| 5,766,725 A | 6/1998 | Hogenboom et al. |
| 5,829,979 A | 11/1998 | Kobashigawa et al. |
| 5,871,604 A * | 2/1999 | Hohman ............... B29C 70/081 156/62.8 |
| 6,053,696 A | 4/2000 | Roberts |
| 6,059,524 A | 5/2000 | Costa et al. |
| 6,098,926 A | 8/2000 | Morgenthaler |
| 6,179,551 B1 | 1/2001 | Sathianathan et al. |
| 6,579,815 B1 | 6/2003 | Popper et al. |
| 6,637,186 B1 | 10/2003 | Van Duyn |
| 6,652,222 B1 | 11/2003 | Wojtyczka et al. |
| 6,740,381 B2 | 5/2004 | Day et al. |
| 6,814,541 B2 | 11/2004 | Evans et al. |
| 6,913,436 B2 | 7/2005 | McMillan |
| 7,479,201 B1 | 1/2009 | Wegner et al. |
| 7,713,021 B2 | 5/2010 | Finn et al. |
| 8,002,919 B2 | 8/2011 | Johnson et al. |
| 8,046,915 B2 | 11/2011 | Xie et al. |
| 8,986,797 B2 | 3/2015 | Xie |
| 8,992,711 B2 | 3/2015 | Hull et al. |
| 2005/0009424 A1 | 1/2005 | Hazan et al. |
| 2005/0011576 A1 | 1/2005 | Dini |
| 2005/0226714 A1 | 10/2005 | Worthoff et al. |
| 2006/0093847 A1 | 5/2006 | Hornick et al. |
| 2007/0081887 A1 | 4/2007 | Xie et al. |
| 2007/0140861 A1 | 6/2007 | Wobben |
| 2008/0023127 A1 | 1/2008 | Misciagna et al. |
| 2008/0128073 A1 | 6/2008 | Xie et al. |
| 2008/0206048 A1 * | 8/2008 | Coupe ............... B29C 70/24 415/200 |
| 2008/0253883 A1 | 10/2008 | Pool et al. |
| 2009/0098337 A1 * | 4/2009 | Xie ............... B29C 70/202 428/121 |
| 2009/0145545 A1 | 6/2009 | Brennan et al. |
| 2009/0155065 A1 * | 6/2009 | Xie ............... F01D 11/122 415/200 |
| 2009/0169833 A1 * | 7/2009 | Koon ............... B29C 70/30 428/195.1 |
| 2010/0028644 A1 * | 2/2010 | Xie ............... D04B 21/16 428/221 |
| 2010/0077721 A1 | 4/2010 | Marshall |
| 2010/0148396 A1 * | 6/2010 | Xie ............... B29B 11/16 264/259 |
| 2010/0150706 A1 * | 6/2010 | Xie ............... B29C 70/88 415/200 |
| 2010/0260602 A1 | 10/2010 | Binks et al. |
| 2011/0052383 A1 | 3/2011 | Lussier |
| 2012/0034076 A1 * | 2/2012 | Xie ............... F01D 21/045 415/200 |
| 2012/0219408 A1 | 8/2012 | Harada et al. |
| 2012/0321838 A1 * | 12/2012 | Nagelsmit ............... B29C 70/202 428/109 |
| 2014/0086734 A1 | 3/2014 | Xie |
| 2014/0154437 A1 | 6/2014 | Schroeder et al. |
| 2014/0352838 A1 * | 12/2014 | Yoon ............... D03D 1/00 139/317 |
| 2015/0083269 A1 * | 3/2015 | Galan Llongueras ............... D03D 13/002 139/420 R |

FOREIGN PATENT DOCUMENTS

| | | |
|---|---|---|
| CN | 1829596 A | 9/2006 |
| CN | 101646548 A | 2/2010 |
| CN | 101898634 A | 12/2010 |
| CN | 102725131 A | 10/2012 |
| DE | 102011080507 A1 | 2/2013 |
| EP | 1060069 A1 | 12/2000 |
| EP | 1 862 646 A2 | 12/2007 |
| EP | 1862646 A2 | 12/2007 |
| EP | 2086746 A1 | 8/2009 |
| EP | 2 940 251 A1 | 11/2015 |
| EP | 2940251 A1 | 11/2015 |
| GB | 1157526 A | 7/1969 |
| JP | 498423 B1 | 2/1974 |
| JP | 5741920 A | 3/1982 |
| JP | 5855219 A | 4/1983 |
| JP | 60261935 A | 12/1985 |
| JP | 0238481 U | 3/1990 |
| JP | 04341837 A | 11/1992 |
| JP | 071620 A | 1/1995 |
| JP | 2002516945 A | 6/2002 |
| JP | 2004537656 A | 12/2004 |
| JP | 2006177364 A | 7/2006 |
| JP | 2008240724 A | 10/2008 |
| JP | 2011098524 A | 5/2011 |
| JP | 2015511668 A | 4/2015 |
| WO | 2015/057270 A1 | 4/2015 |
| WO | 2015057270 A1 | 4/2015 |

OTHER PUBLICATIONS

Eagles et al., "Interfacial Properties of Kevlar-49 Fiber-Reinforced Thermoplastics", Journal of Applied Polymer Science, vol. No. 20, Issue No. 2, pp. 435-448, Feb. 1976.

Northolt et al., "PIPD, a New High-Modulus and High-Strength Polymer Fibre with Exceptional Fire Protection Properties", Fire and Materials, vol. No. 26, Issue No. 4-5, pp. 169-172, Jul. 2002.

Abdalla et al., "Formulation of Composite Laminate Robustness Constraint in Lamination Parameters Space", 50th AIAA/ASME/ASCE/AHS/ASC Structures, Structural Dynamics and Materials Conference, Palm Springs, California, pp. 1-15, May 4-7, 2009.

PCT Search Report and Written Opinion issued in connection with Related PCT Application No. PCT/US2011/046430 dated Oct. 19, 2011.

PCT International Preliminary Report on Patentability issued in connection with Related PCT Application No. PCT/US2011/046430 dated Feb. 14, 2013.

U.S. Non-Final Office Action Issued in Connection with Related U.S. Appl. No. 13/196,502 dated Jul. 30, 2013.

PCT Search Report and Written Opinion issued in connection with Related PCT Application No. PCT/US2013/055662 dated Nov. 22, 2013.

U.S. Final Office Action Issued in Connection with Related U.S. Appl. No. 13/196,502 dated Jan. 9, 2014.

Chinese Office Action issued in connection with Related CN Application No. 201180048105.9 dated Jun. 30, 2014.

PCT Search Report and Written Opinion issued in connection with Related PCT Application No. PCT/US2014/037854 dated Sep. 18, 2014.

U.S. Non-Final Office Action Issued in Connection with Related U.S. Appl. No. 13/624,253 dated Feb. 13, 2015.

U.S. Non-Final Office Action Issued in Connection with Related U.S. Appl. No. 13/906,127 dated Mar. 20, 2015.

(56) References Cited

OTHER PUBLICATIONS

PCT International Preliminary Report on Patentability issued in connection with Related PCT Application No. PCT/US2013/055662 dated Apr. 2, 2015.
Unofficial English Translation of Japanese Office Action issued in connection with Related JP Application No. 2013523307 dated Jun. 30, 2015.
U.S. Final Office Action Issued in Connection with Related U.S. Appl. No. 13/906,127 dated Jul. 14, 2015.
U.S. Final Office Action Issued in Connection with Related U.S. Appl. No. 13/624,253 dated Jul. 30, 2015.
U.S. Notice of Allowance Issued in Connection with Related U.S. Appl. No. 13/906,127 dated Oct. 21, 2015.
PCT International Preliminary Report on Patentability issued in connection with Related PCT Application No. PCT/US2014/037854 dated Dec. 10, 2015.
Unofficial English Translation of Chinese Office Action issued in connection with Related CN Application No. 201380049155.8 dated Jan. 29, 2016.
European Office Action issued in connection with Related EP Application No. 11745647.5 dated Feb. 10, 2016.
Unofficial English Translation of Japanese Office Action issued in connection with Related JP Application No. 2013523307 dated Jul. 5, 2016.
Unofficial English Translation of Chinese Office Action issued in connection with Related CN Application No. 201480031280.0 dated Oct. 9, 2016.
Unofficial English Translation of Japanese Search Report issued in connection with Related JP Application No. 2016516681 dated Jan. 16, 2017.
Unofficial English Translation of Japanese Notice of Allowance issued in connection with Related JP Application No. 2013523307 dated Feb. 7, 2017.
Unofficial English Translation of Japanese Office Action issued in connection with Related JP Application No. 2016516681 dated Mar. 7, 2017.
Canadian Office Action issued in connection with Related CA Application No. 2913537 dated Mar. 9, 2017.
European Search Report and Opinion issued in connection with corresponding EP Application No. 17150512.6 dated Mar. 21, 2017.
Canadian Office Action issued in connection with Related CA Application No. 2807395 dated Mar. 24, 2017.
Machine translation and First Office Action and Search issued in connection with corresponding CN Application No. 201710024630.6 dated Jun. 26, 2018.

* cited by examiner

METHOD AND SYSTEM FOR FIBER REINFORCED COMPOSITE PANELS

BACKGROUND

The field of the disclosure relates generally to gas turbine engines and, more particularly, to a method and system for tailoring in-plane characteristics of fiber reinforced composite panels using short fibers.

At least some known gas turbine engines include rotating components mounted to shafts and surrounded by shrouds and or casings that provide structural support and air flow guidance through the gas turbine engine. The rotating components, such as, the blades of fans, compressors, and turbines, for example, rotate with a tip of the respective component passing very close to the shrouds or casings. During some events, for example, a bird ingestion into the gas turbine engine, the blades may contact the shrouds or casings. Such events typically cause damage to the shrouds or casings and the blades. The damage may also cause the gas turbine engine to operate with a lesser capability, necessitating repair. To facilitate mitigating such damage and possibly forestalling immediate repair necessity, some shrouds or casings are equipped with abradable panels that circumscribe at least some of the rotating components, such as, the fan blades. The abradable panels serve to form a portion of the flow path of the fan assembly. However, during an event where the blade contacts the abradable panels of the fan casing, the abradable material at least partially yields, minimizing the damage to the fan blades. The abradable panel is designed to be relatively easy to replace or repair such that total maintenance time to repair the casing after an event is minimized. In the event of larger rotor unbalance and the fan blades contact the fan casing components behind the abradable panels, these components in the fan casing may not be configured to yield sufficiently to prevent damage to the fan blades. These components in the fan casing are usually formed to be relatively strong and/or stiff. While these characteristics of strength and stiffness may, in many instances, be desirable, in other instances they may be detrimental.

BRIEF DESCRIPTION

In one aspect, a fan assembly includes a plurality of blades circumferentially spaced about a fan disk, each blade of the plurality of blades extending radially outwardly from the disk to a blade tip and a fan case assembly circumscribing the plurality of blades. The fan case assembly includes a radially outer casing including a radially inner side, an inner structure including an inner surface and a honeycomb layer extending along the radially inner side, and a composite panel structure including an inner surface and extending circumferentially along the inner structure inner surface. The composite panel structure includes short fiber tows of at least one of carbon fiber, glass fiber, and aramid fiber extending only partially along at least one of a circumferential path, an axial path, and a diagonal path in the composite panel structure.

In another aspect, a method of fabricating a composite panel structure having short fiber tows with multiple lengths and orientations includes forming a plurality of layers of a plurality of short fiber tows wherein each of the short fiber tows has a length of less than approximately twelve inches. Each of the short fiber tows is oriented in at least one of an axial direction, a circumferential direction, and a diagonal direction along the composite panel structure. At least some of the short fiber tows in each layer are abutted end-to-end with other short fiber tows in the same or an adjacent layer.

In yet another aspect, a turbofan engine includes a core engine including a multistage compressor and a fan assembly including a fan powered by a power turbine driven by gas generated in the core engine, a plurality of blades circumferentially spaced about a fan disk, each blade of the plurality of blades extending radially outwardly from the disk to a blade tip and a fan case assembly circumscribing the plurality of blades. The fan case assembly includes a radially outer casing, an inner structure including a honeycomb layer extending along a radially inner side of the outer casing, and a composite panel structure extending circumferentially about an inner surface of the inner structure, the composite panel structure including short fiber tows extending only partially along at least one of a circumferential path, an axial path, and a diagonal path in the composite panel structure.

DRAWINGS

These and other features, aspects, and advantages of the present disclosure will become better understood when the following detailed description is read with reference to the accompanying drawings in which like characters represent like parts throughout the drawings, wherein.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

Embodiments of a composite panel structure described herein provide a fabrication method for short fiber reinforced composite panels that are used as the substrate of abradable panels on the fan containment case. The composite panels can be fabricated using an automated fiber placement (AFP) manufacturing process, which can be used to place short fiber tows with varying fiber orientations and interleaving the fiber tows in the composite panel, if needed.

These short fiber reinforced composite panels are designed to have unique in-plane mechanical and physical properties, such as specific in-plane strength and specific in-plane coefficient of thermal expansion (CTE).

A circumferential strength of these composite panel structures are configured to be low to minimize fan blade tip damage during a fan blade out (FBO) event. The short fiber reinforced composite panel has a lower strength than a long continuous fiber reinforced composite panel, such as those currently used in legacy designs. Another design variable is fiber orientation, which are used to design to a specific material strength.

Using short fiber with varying fiber length and orientations also provides design flexibility to achieve a certain coefficient of thermal expansion (CTE) that has a better match to a CTE of the fan case, which facilitates reducing abradable panel cracking in the field. Designing to a certain CTE can also reduce the fan tip clearance at cruise altitude to improve engine's fuel burn efficiency.

Figure 1:
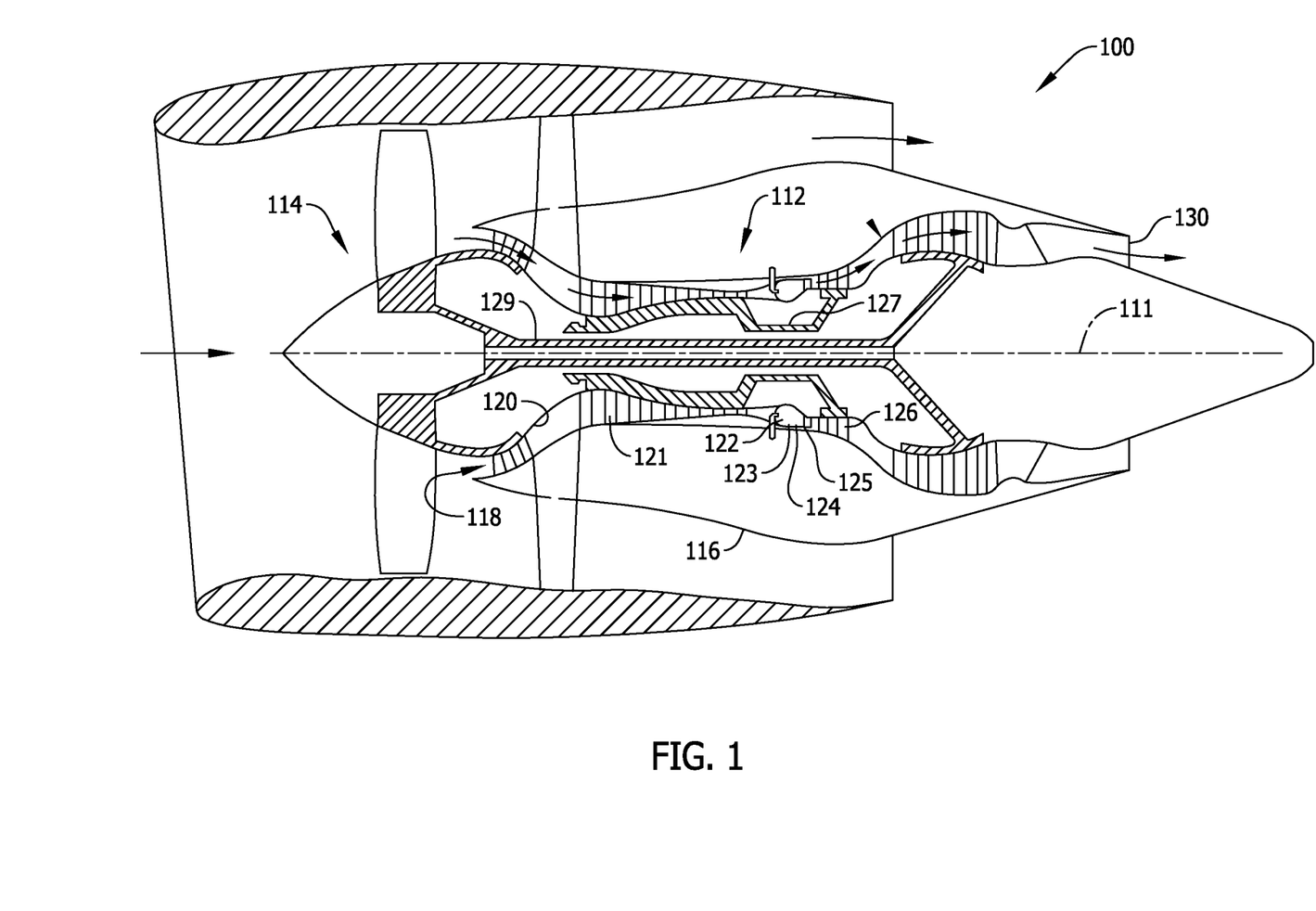
FIG. 1 is a cross-sectional view of an exemplary turbine engine assembly.

FIG. 1 is a cross-sectional view of an exemplary turbine engine assembly 100 having a longitudinal or centerline axis 111 therethrough. Although FIG. 1 shows a turbine engine assembly for use in an aircraft, engine assembly 100 is any turbine engine that facilitates operation as described herein, such as, but not limited to, a ground-based gas turbine engine assembly. Engine assembly 100 includes a core turbine engine 112 and a fan assembly 114 positioned upstream of core turbine engine 112. Core engine 112 includes a generally tubular outer casing 116 that defines an annular inlet 118. Outer casing 116 further encloses and supports a booster compressor 120 for raising the pressure of air entering core engine 112. A high pressure, multi-stage, axial-flow high pressure compressor 121 receives pressurized air from booster compressor 120 and further increases the pressure of the air. The pressurized air flows to a combustor 122, generally defined by a combustion liner 123, and including a mixer assembly 124, where fuel is injected into the pressurized air stream, via one or more fuel nozzles 125 to raise the temperature and energy level of the pressurized air. The high energy combustion products flow from combustor 122 to a first (high pressure) turbine 126 for driving high pressure compressor 121 through a first (high pressure) drive shaft 127, and then to a second (low pressure) turbine 128 for driving booster compressor 120 and fan assembly 114 through a second (low pressure) drive shaft 129 that is coaxial with first drive shaft 127. After driving each of turbines 126 and 128, the combustion products leave core engine 112 through an exhaust nozzle 130 to provide propulsive jet thrust.

Figure 2:
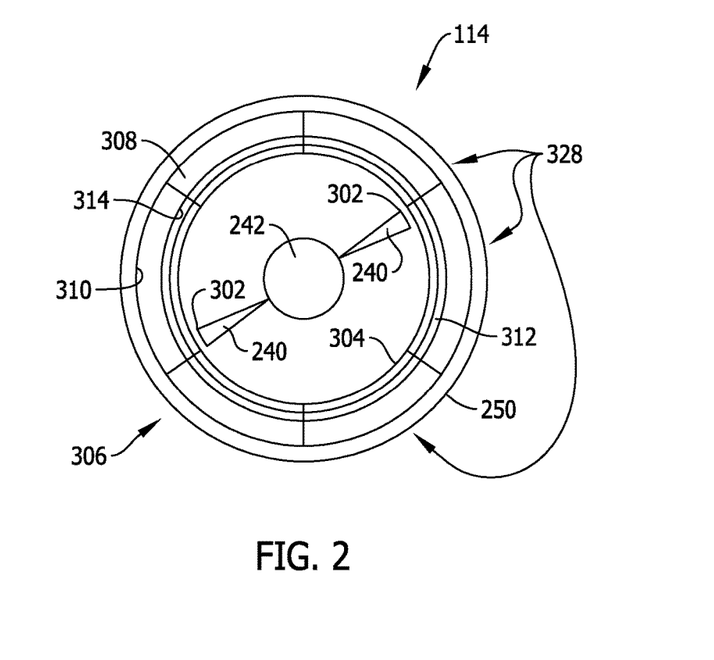
FIG. 2 is an axial view looking aft of the fan assembly shown in FIG. 1.
Figure 3:
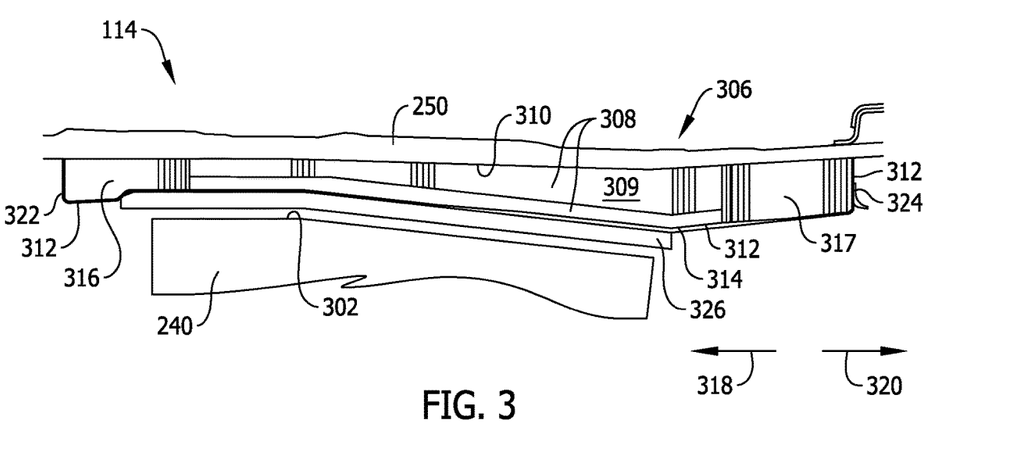
FIG. 3 is a side elevation view of a portion of the fan assembly shown in FIG. 2.

FIG. 2 is an axial view looking aft of fan assembly 114. FIG. 3 is a side elevation view of a portion of fan assembly 114. In the example embodiment, fan assembly 114 includes plurality of blades 240 circumferentially spaced about fan disk 242. Although described as a fan disk having a plurality of blades, for example, fan disk 242 and blades 240, fan assembly 114 may instead be formed with a blisk or integrally bladed rotor. Only two blades 240 are shown for clarity, however, fan assembly 114 typically includes more blades 240, for example, approximately twenty to thirty blades 240 or more. Each blade 240 of plurality of blades 240 extends radially outwardly from disk 242 to a blade tip 302, which passes proximate an inner surface 304 of a fan case assembly 306. Fan case assembly 306 includes radially outer casing 250, an inner structure 308 including an optional honeycomb layer 309 extending along a radially inner side 310 of outer casing 250. Fan case assembly 306 further includes a composite panel structure 312 that extends circumferentially about an inner surface 314 of inner structure 308.

In the example embodiment, composite panel structure 312 is formed of short fiber tows pre-impregnated with resin material and applied using an automatic fiber placement (AFP) machine. The short fiber tows extend only partially along at least one of a circumferential path, an axial path, and a diagonal path in composite panel structure 312. In typical uses of fiber reinforced composites, long fibers are used to provide enhanced strength and stiffness characteristics. In the example embodiment, such strength and stiffness is avoided and a purposeful weakness is built into the in-plane mechanical and physical properties of composite panel structure 312. Additionally, an in-plane coefficient of thermal expansion (CTE) of composite panel structure 312 is also selectable during fabrication. Such properties or characteristics are selected based on a length of fiber tows, placement of fibers with respect to each other, placement of fibers with respect to an orientation of fan assembly 114, meaning whether the fibers are oriented axially, circumferentially, or diagonally. An amount of fibers placed in each orientation also at least partially determines the in-plane mechanical and physical properties and in-plane CTE of composite panel structure 312.

In some embodiments, fan assembly 114 includes an abradable layer 326 that extends circumferentially about inner surface 314 of composite panel structure 312.

In some embodiments, composite panel structure 312 includes a plurality of composite panel sectors 328 that extend only partially around a circumference of composite panel structure 312. Coupled together in circumferential abutting fashion, sectors 328 form a 360° composite panel structure 312. In other embodiments, composite panel structure 312 extends 360° about a circumference of fan case assembly 306 wherein the short fiber tows extend circumferentially less than 45°. In still other embodiments, the short fiber tows extend circumferentially less than 25°. In yet other embodiments, the short fiber tows extend circumferentially less than 15°. In some cases, shorter tows are used, for example, the short fiber tows may extend less than twelve inches in length. In further embodiments, the short fiber tows extend less than eight inches in length or less than six inches in length. However, a limitation of an AFP machine may affect the tow length in practical applications. For example, a physical position of cutting knives in an application head of the AFP machine may prevent tow lengths of less than four inches. However, this is not a limitation of the short fiber application, but rather of the AFP machine and shorter tow lengths are contemplated using an AFP machine with this capability.

Figure 4A:
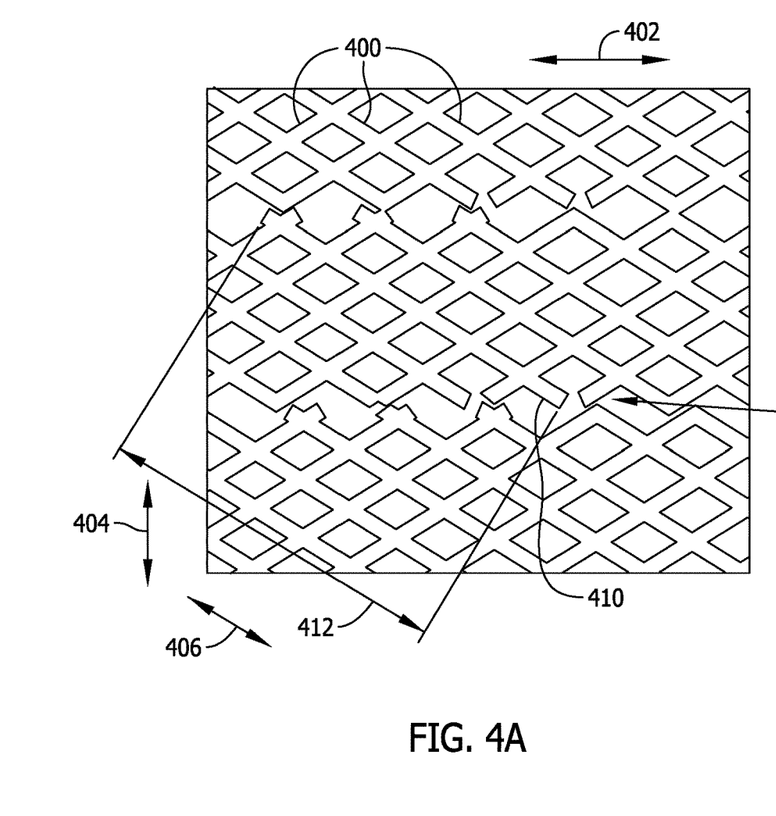
FIG. 4A is a layup of a layer of the composite panel structure shown in FIG. 3.
Figure 4B:
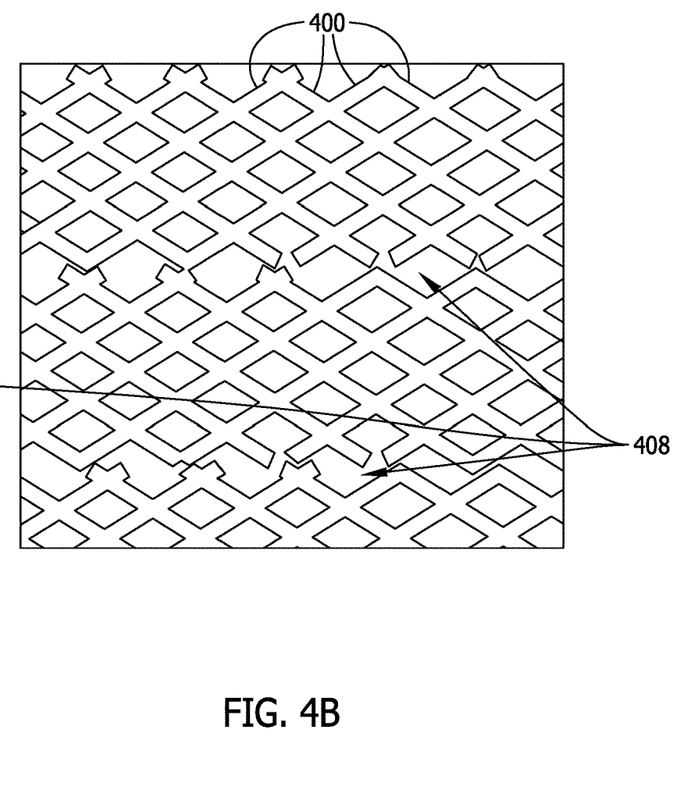
FIG. 4B is a layup of yet another layer of the composite panel structure shown in FIG. 3.
Figure 4C:
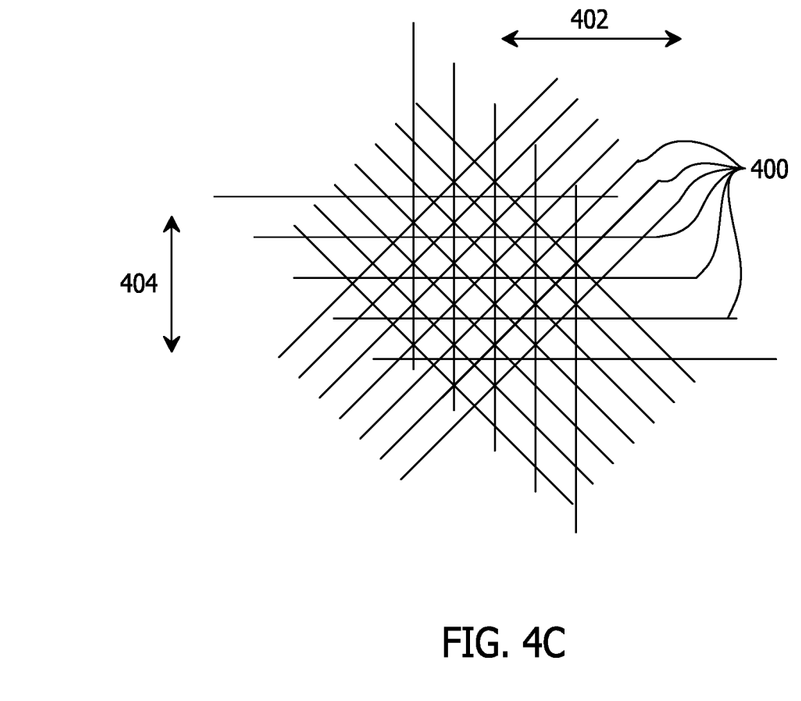
FIG. 4C is a layup of a layer of the composite panel structure shown in FIG. 3 where the tows are placed in various orientations.

FIG. 4A is a layup of a layer of composite panel structure 312 (shown in FIGS. 2 and 3). FIG. 4B is a layup of yet another layer of composite panel structure 312 (shown in FIGS. 2 and 3), in which the fiber tow butt joints are offset from the butt joint in FIG. 4A. FIG. 4C is a layup of a layer of composite panel structure 312 (shown in FIGS. 2 and 3) where fiber tows 400 are placed in various orientations. In the example embodiment, fiber tows 400 of various lengths are interleaved in a plurality of directions, including an axial direction 402, a circumferential direction 404, and a diagonal direction 406. Short fiber tows 400, medium length tows 400, and long length tows 400 are used in predetermined locations to generate a specific in-plane strength and CTE in the composite panel structures. Additionally, butt joints 408 are positioned in predetermined locations to also generate a specific in-plane strength and CTE in the composite panel structures. As layers are built up on previously laid layers during fabrication, butt joints 408 may be radially aligned or offset to generate a specific in-plane strength and CTE in the composite panel structures. FIGS. 4A and 4B show two layers with offset butt joints. An example short fiber tow includes a length 412, which is approximately 4.5 inches to approximately 6.0 inches. Other tows 400 extend approximately 8.0 inches in length and approximately 12.0 inches in length.

Embodiments of composite panel structure 312 include short pre-impregnated fiber tow with multiple lengths and orientations, designed to specific in-plane strength and CTE, fiber interleaving to improve thru-thickness toughness, and butt joints at fiber tow start/stop locations to facilitate in-plane breakage during an FBO event.

The above-described composite panel structures provide an efficient method for fan assembly protection, composite panel structure fabrication, and use. Specifically, the above-described composite panel structure includes short fibers with varying fiber orientations having a circumferential strength configured to be low to minimize fan blade tip damage during an FBO event. Using short fibers with varying fiber orientations also provides design flexibility to achieve a certain coefficient of thermal expansion (CTE) that has better match to a CTE of the fan case, which facilitates reducing abradable panel cracking in the field, and also provide a better fan clearance by selecting the thermal expansion of the fan case assembly.

The above-described embodiments of a composite panel structure and method of fabrication provide a cost-effective and reliable means for generating a composite panel with specific in-plane physical characteristics. More specifically, the methods and systems described herein facilitate using short pre-impregnated fiber tows with multiple lengths and orientations, designed to specific in-plane strength and CTE, fiber interleaving to improve thru-thickness toughness, and butt joints at fiber tow start/stop locations to facilitate in-plane breakage during an FBO event. As a result, the methods and systems described herein facilitate matching in-plane strength and CTE of the composite panel structure to specific requirements in a cost-effective and reliable manner.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A fan assembly comprising:
    a plurality of blades circumferentially spaced about a fan disk, each blade of said plurality of blades extending radially outwardly from said disk to a blade tip; and
    a fan case assembly circumscribing said plurality of blades, said fan case assembly comprising:
        a radially outer casing including a radially inner side;
        an inner structure including an inner surface extending along said radially inner side; and
        a composite panel structure including an inner surface and extending circumferentially along said inner structure, said composite panel structure comprising a plurality of short fiber tows, each of the plurality of short fiber tows extending only along at least one of a circumferential path, an axial path, and a diagonal path in the composite panel structure.

2. The fan assembly of claim 1, wherein said composite panel structure extends at least one of axially forward of said inner structure and axially aft of said inner structure.

3. The fan assembly of claim 1, further comprising an abradable layer extending circumferentially along said inner surface of said composite panel structure.

4. The fan assembly of claim 1, wherein said composite panel structure comprises a plurality of composite panel sectors extending only partially along an inner circumference of said composite panel structure.

5. The fan assembly of claim 1, wherein said composite panel structure extends 360° along an inner circumference of said fan case assembly, each of the plurality of short fiber tows extend circumferentially less than 45°.

6. The fan assembly of claim 1, wherein said fiber tows comprises at least one of carbon fiber, glass fiber, aramid fiber, and combinations thereof.

7. The fan assembly of claim 1, wherein each of the plurality of short fiber tows extends less than twelve inches in length.

8. The fan assembly of claim 1, wherein each of the plurality of short fiber tows extend less than eight inches in length.

9. The fan assembly of claim 1, wherein each of the plurality of short fiber tows extend less than six inches in length.

10. A turbofan engine comprising:
    a core engine including a multistage compressor;
    a fan assembly comprising:
        a plurality of blades circumferentially spaced about a fan disk powered by a power turbine driven by gas generated in said core engine, each blade of said plurality of blades extending radially outwardly from said disk to a blade tip; and
        a fan case assembly circumscribing said plurality of blades, said fan case assembly comprising:
            a radially outer casing including an inner side;
            an inner structure including an inner surface extending along said radially inner side; and
            a composite panel structure including an inner surface and extending circumferentially along said inner structure inner surface, said composite panel structure comprising a plurality of short fiber tows, each of the plurality of short fiber tows extending only along at least one of a circumferential path, an axial path, and a diagonal path in the composite panel structure.

11. The engine of claim 10, wherein said fiber tows in the composite panel structure comprises at least one of carbon fiber, glass fiber, aramid fiber, and combinations thereof.

12. The engine of claim 10, wherein said composite panel structure extends at least one of axially forward of said inner structure and axially aft of said inner structure.

13. The engine of claim 10, further comprising an abradable layer extending circumferentially along said inner surface of said composite panel structure.

14. The engine of claim 10, wherein said composite panel structure comprises a plurality of composite panel sectors extending only partially along an inner circumference of said composite panel structure.

\* \* \* \* \*